Patented Apr. 8, 1930

1,754,171

UNITED STATES PATENT OFFICE

HERMANN KÖPPLINGER, OF VIENNA, AUSTRIA

PREPARATION FOR REMOVING OR PREVENTING BOILER SCALE AND OTHER LIKE DEPOSITS

No Drawing. Application filed February 10, 1926, Serial No. 87,462, and in Germany January 4, 1926.

This invention relates to a process and means for preventing the formation of hard deposits of the salt content of heated water, such as hard scale in boilers and the like, and for removing such incrustations when already formed.

A process suitable for this purpose has been disclosed by the U. S. A. Patent No. 1,557,349. It consists of adding either to the feed water or else to the water contained in the boiler, resins and organic colloids exercising a protective action on the resins, said colloids having the property of causing the resins to form emulsions or colloidal solutions with the boiler water under the conditions of pressure and of temperature existing in the boiler when normally operated Furthermore, according to the cited specification, there are certain resins which in their natural state are adapted for the purpose aimed at, as for instance the gum resins, which—by themselves—are progressively soluble in hot water owing to the fact that they contain certain species of gum as natural constituents. A material extraordinarily adapted for carrying out the process in question is e. g. olibanum, the well known incense used for a long time as a fumigant, which contains about 50 to 60% of resin, 20 to 30% of gum and 3 to 7% of volatile essential oils.

Up till now the question was not cleared up, whether besides the gum also the other constituents of olibanum act as protective colloids exercising a peptizing action on the resins, or if single components may in addition to said action exercise some special influence on the scale forming constituents of the water. As a result of exhaustive scientific research and numerous experiments I have now found the surprising fact, that the essential oils and particularly also the resene as well as the Boswellia acid contained in the natural gum-resin olibanum enact a very important part in the action of olibanum as boiler compound. It is just the hitherto unknown effect of these components for counteracting incrustations, owing to which the required quantity of the said gum-resin is exceedingly small as well regarded for itself, as in relation to the scale forming salts of the water to be evaporated, so that by the necessary quantities to be added for preventing incrustations neither the boiler water nor the sludge are substantially contaminated.

I have found, that the essential oils exercise a specific action on the scale which has been formed on the interior surface and on the tubes of the boiler, owing to which a mechanical destruction and particularly the bursting off of the scale results. Moreover I have demonstrated, that the resene and the Boswellia acid contained in the olibanum undergo decomposition in the boiler water, by which decomposition rather immediately beginning, but very slowly proceeding, traces of volatile substances are generated, removing incrustations in quite the same manner as the volatile oils and continually replacing in this way the essential oils originally contained in the gum-resins, which oils, owing to their high volatility, quickly distill off. This is the full and exhaustive explanation of the long lasting efficiency of said natural resin mixture.

On the basis of the new knowledge the following rules for operating may be given:

1. If a resin is employed, which is rendered capable of being emulsified or of being colloidally dissolved by means of a water soluble protective colloid, it is—particularly when very difficultly removable scale is to be detached—indispensible, that from the very beginning essential oils are added in order to provoke fissures in the layer of scale coating the boiler wall and thus to initiate the bursting thereof.

2. Instead of a mixture of resin and of essential oils raw turpentine or other natural balsams may be used with even better result. In doing so it may under certain circumstances be advisable to introduce into the water besides the raw turpentine or the other balsam either essential oils or resins or both. Natural balsams as referred to herein consist of or at least contain oleoresins. The term "raw turpentine" is used to indicate gum turpentine, which may be in a crude condition if desired, this material being an oleoresin. Oleoresins upon being boiled in the water within the boiler will liberate essential oils leaving resins in the boiler water.

Moreover from said new recognition further conclusions have been derived, which are capable of showing quite new ways for counteracting incrustation. I have stated, that the same action, as performed by volatile oils and related substances can also be brought about by a number of different substances quite independently of their chemical composition, provided that they answer the following two conditions:

*a.* They must be substantially insoluble in water.

*b.* They are volatile with steam, mainly such substances of this kind being adapted, which are either liquid or more or less fusible. Of the substances adapted in this sense as disincrustants may be named: the distillation products of resins and balsams (such as the resin oils which are a distillation product of colophony), moreover hydrogenated naphthalene (tetrahydronaphthalene, decahydronaphthalene), pine-oil and other wood oils furthermore benzol and other hydrocarbons of the aromatic series, finally terpene or camphor. These substances are all the more suitable for said purpose the lower their vapor tension is. For this reason it is to be preferred to add to the volatile substances some agent by which their escape by distillation is retarded. Resins and balsams of all kind—in view of their above mentioned special qualification—may be employed for this purpose, it being advantageous to render these additions capable of being finely dispersed in water by means of small quantities of protective colloids capable of exercising a peptizing action on resins and balsams such as soaps capable of being emulsified with water, mucilage and the like.

In economical respect it is of importance, that the action of all these substances is perfectly independent of the nature and chemical composition of the soluble substances contained in the boiler water and of the other impurities present therein. The required quantities are considerably smaller than even those of the substances to be employed in accordance with the former knowledge viz of the gum resins or other resins finely dispersed in the water. These quantities are merely proportionate to the amount of residue of evaporation of the boiler water, whilst the amount necessary for the removal of scale already existing mainly depends on the area of the fire-surface and on the thickness of the layer of scale.

The hereinbefore described method is in the first instance intended to be employed for doing away with the scale from boilers of power plants and the like, but it may just as well and with the same advantageous result be employed wherever the formation of hard deposits of the salt-content of water is to be prevented or where such incrustations are to be removed.

By the following some examples of suitable artificial mixtures are given:

1. 100 parts by weight of powdered colophony are intimately mixed with 4 parts by weight of resin soap, for instance saponified pitch resin and 10 parts by weight of essential oils, for instance eucalyptus oil or dwarf pine oil.

2. 100 parts by weight of raw turpentine are mixed with 100 parts by weight of pitch resin entirely or partly saponified by means of any alkaline agents generally used for saponifying resins, e. g. potassium hydroxide.

3. 100 parts by weight of the elemi-balsam of Manila are mixed with 10 parts by weight of essential oils, for instance eucalyptus oil or dwarf pine oil.

4. 100 parts by weight of raw turpentine are intimately mixed with 4 parts by weight of a soap emulsifiable with water, 40 parts by weight of essential oils or dekaline (decahydro-naphthalene) or mixtures thereof, and 70 parts by weight of a powdered resin.

According to the percentage of the solid or liquid ingredients the product obtained by intimately mixing them may either be liquid or highly viscous or even paste-like. In any case it is easily emulsifiable in water and may be employed by introducting it either into the boiler or into the feed water just as it is or preliminarily emulsified with water.

If the water is not of an unusually high hardness, that is to say for ordinary cases of incrustation, 0.3 up to 1.5 grammes of any one of these mixtures are required to be added (at any stage) for every cubic meter of water to be evaporated. This corresponds to the relation of one part of the preparation to 3,333,333 parts, and down to 666,666 parts of the water. It is to be pointed out, that under favorable circumstances, that is to say for a very slight incrustation the above indicated smaller amount of the mixture may not even be necessary, whilst surpassing the upper limit may only be necessary in very exceptional cases, that is to say for very hard or extensive incrustation.

In the following claims I use the term "resinous body" to include not only resins of any kind but also natural balsams and oleoresins and mixtures of the said substances.

By using the term "essential oils" I wish to include also the characteristic constituents of the said oils such as terpene, pinene, phellandrene, dipentene, cadinene or the like.

I claim:

1. Preparations for preventing the scale forming constituents of water from settling as hard deposits and for removing incrustations already formed consisting of artificial mixtures, which simultaneously contain a resinous body, a relatively small per cent of protective colloids having the property of emulsifying the resinous body with the water, and essential oils.

2. Preparations for preventing the scale forming constituents of water from settling as hard deposits and for removing incrustations already formed consisting of artficial mixtures, which simultaneously contain resins, balsams, a relatively small per cent of protective colloids having the property of exercising a peptising action on the resin, and essential oils.

3. Preparations for preventing the scale forming constituents of water from settling as hard deposits and for removing incrustations consisting of a mixture of 70 parts by weight of resin, 100 parts by weight of raw turpentine, 4 parts by weight of soap, and 40 parts by weight of an oil which is volatile with steam.

4. Preparations for preventing the scale forming constituents of water from settling as hard deposits and for removing incrustations already formed consisting of a mixture of 70 parts by weight of resin, 100 parts by weight of raw turpentine, 4 parts by weight of soap, and 40 parts by weight of an essential oil.

5. Method of preventing and removing boiler scale which comprises adding to the boiler water a trace of an artificial mixture comprising a resinous body, a protective colloid thoroughly mixed therewith to aid in the dispersion of said resinous body in the boiler water, and an essential oil.

In testimony whereof I have affixed my signature.

HERMANN KÖPPLINGER.